United States Patent
Manoria et al.

(10) Patent No.: US 12,021,897 B2
(45) Date of Patent: Jun. 25, 2024

(54) ENDPOINT AND REMOTE SERVER PROTECTION

(71) Applicant: International Business Machines Corporation, Armonk, NY (US)

(72) Inventors: Vikas Kumar Manoria, Bengaluru (IN); Anuj Shrivastava, Bangalore (IN); Prasad Velagapudi, Visakhapatnam (IN); Nikhil Bhavsar, Thane (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/521,147

(22) Filed: Nov. 8, 2021

(65) Prior Publication Data

US 2023/0144947 A1 May 11, 2023

(51) Int. Cl.
*H04L 29/06* (2006.01)
*G06F 9/451* (2018.01)
*H04L 9/40* (2022.01)

(52) U.S. Cl.
CPC .......... *H04L 63/1491* (2013.01); *G06F 9/451* (2018.02); *H04L 63/10* (2013.01); *H04L 63/20* (2013.01)

(58) Field of Classification Search
CPC ....... H04L 63/101; H04L 63/10; H04L 63/20; H04L 63/108; H04L 63/145; H04L 63/1408
USPC .......................................................... 726/4
See application file for complete search history.

(56) References Cited

U.S. PATENT DOCUMENTS

| | | | |
|---|---|---|---|
| 9,411,955 B2* | 8/2016 | Jakobsson | H04L 63/14 |
| 9,489,513 B1 | 11/2016 | Mesropian | |
| 9,600,166 B2 | 3/2017 | Mouton | |
| 9,690,934 B1* | 6/2017 | Sundaram | G06F 21/6227 |
| 10,063,654 B2 | 8/2018 | Kirti | |
| 10,298,598 B1* | 5/2019 | McClintock | H04L 63/1483 |
| 10,673,888 B1 | 6/2020 | Dudhe | |
| 2010/0269175 A1 | 10/2010 | Stolfo | |
| 2015/0319145 A1 | 11/2015 | Keohane | |

(Continued)

FOREIGN PATENT DOCUMENTS

| | | |
|---|---|---|
| EP | 3017350 B1 | 5/2019 |
| WO | 20160138067 A1 | 1/2016 |

OTHER PUBLICATIONS

Anonymous. "Discover the Planned Activities of an Identity Imposter." Feb. 10, 2021. 6 pages. Published by IP.com. https://priorart.ip.com/IPCOM/000264953.

(Continued)

*Primary Examiner* — Longbit Chai
(74) *Attorney, Agent, or Firm* — Aaron N. Pontikos

(57) ABSTRACT

A processor may install an imposter security client (ISC) at an endpoint. The processor may install a subscription based imposter security service (ISS). The ISS may be part of an identity and access management (IAM) system. The processor may exchange information between the ISC and the ISS. The exchange may be automatically triggered when the ISS receives an imposter identification (ID) from the IAM system. The imposter ID may be associated with an unauthorized endpoint user. The processor may protect the endpoint from the unauthorized endpoint user.

12 Claims, 6 Drawing Sheets

(56) References Cited

U.S. PATENT DOCUMENTS

2018/0097847 A1 4/2018 Carver

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

ENDPOINT AND REMOTE SERVER PROTECTION

BACKGROUND

The present disclosure relates generally to the field of identity and access management (IAM), and more specifically to protecting endpoints and remote servers from unauthorized users.

IAM is a critical part of any enterprise security plan, as it is inextricably linked to the security and productivity of organizations. Knowing the importance of identity and IAM protection mechanisms, digital wrongdoers are adopting many methods, such as phishing, malware attacks, social engineering, and other low-tech tactics, to steal identities.

SUMMARY

Embodiments of the present disclosure include a method, computer program product, and system to secure an endpoint from invalid users. A processor may install an imposter security client (ISC) at an endpoint. The processor may install a subscription based imposter security service (ISS). The ISS may be part of an identity and access management (IAM) system. The processor may exchange information between the ISC and the ISS. The exchange may be automatically triggered when the ISS receives an imposter identification (ID) from the IAM system. The imposter ID may be associated with an unauthorized endpoint user. The processor may protect the endpoint from the unauthorized endpoint user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
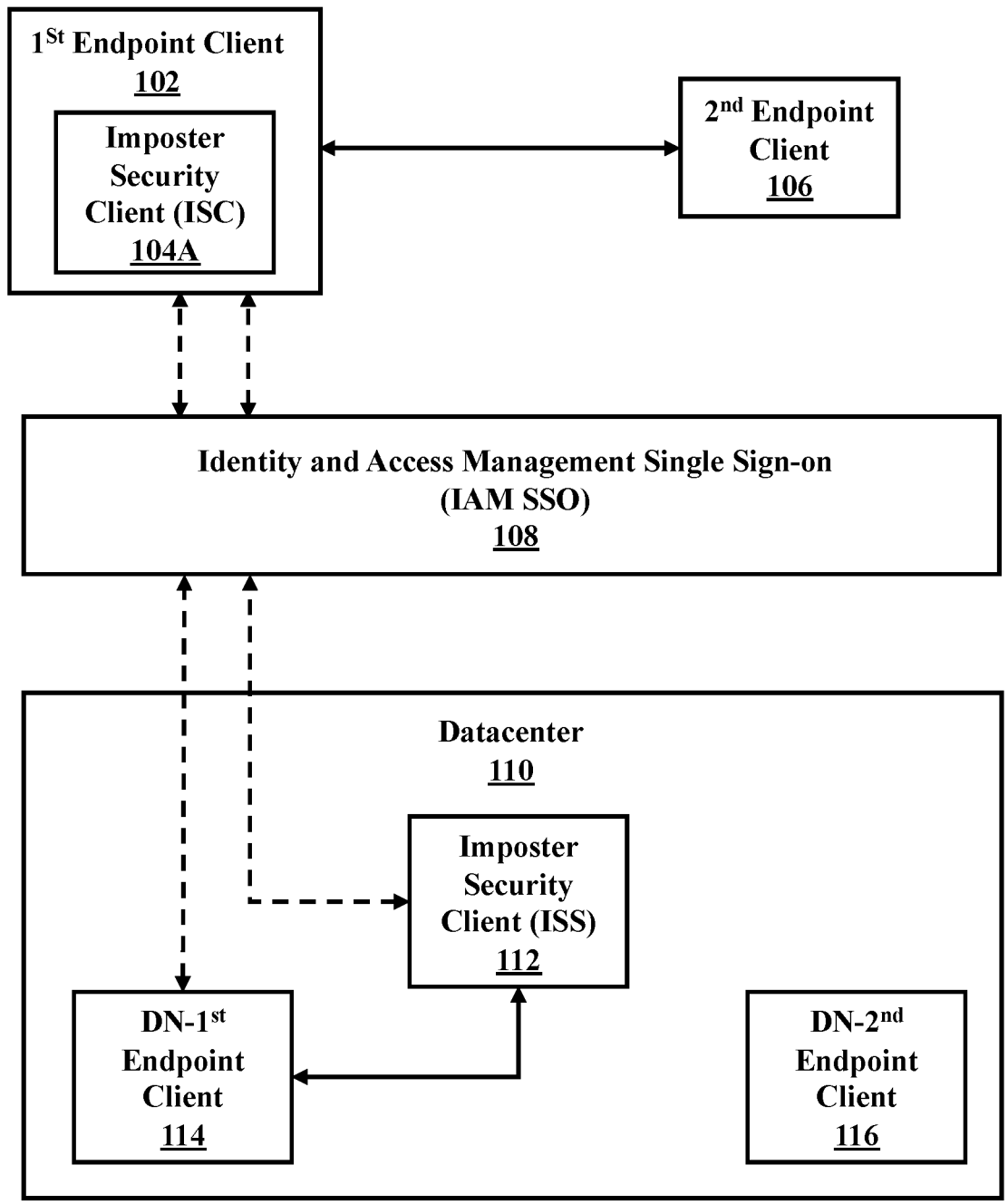
FIG. 1A illustrates a block diagram of an example endpoint and remote server architecture, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of identity and access management (IAM), and more specifically to protecting endpoints and remote servers from unauthorized users. While the present disclosure is not necessarily limited to such applications, various aspects of the disclosure may be appreciated through a discussion of various examples using this context.

Identity and access management (IAM) in enterprise IT is about defining and managing the roles and access privileges of individual network users and the circumstances in which users are granted or denied privileges. Those users might be customers, employees, etc. The core objective of IAM systems is to create, maintain, modify, and monitor one digital identity per individual throughout each user's access lifecycle. At the same time, IAM enables users to be more productive (while staying secure) in a variety of environments, whether they're working from home, the office, or on the road.

Accordingly, IAM is a critical part of any enterprise security plan, as it is inextricably linked to the security and productivity of organizations in today's digitally enabled economy. Knowing the importance of identity and IAM protection mechanisms, digital wrongdoers are adopting many methods, such as phishing, malware attacks, social engineering, and other low-tech tactics, to steal identities. These stolen identities are generally sold to identity fraudsters who use these identities to commit the wrongdoing, mostly for financial gains.

Products like IBM® Trusteer are mature enough today to detect these identity imposters (e.g., unauthorized users, unregistered users, etc.) thru their behavior, access location, or devices being used. As a new development, IAM is now not rejecting access to imposters in some cases, but allowing these imposters to access integrated systems to secretly gather the integrated systems plans/information and gather unchallengeable proofs required to bring action against the imposters. As soon as an TAM detects identity breach, it creates/generates an imposter identification (ID) instead of a normal user authentication ID and shares it with all integrated systems. An imposter ID comprises details of the user ID which is compromised; a suspected ID if detected; and/or a risk score (high, medium, or low) based on detected and calculated risk factors.

In the scenario discussed above, the role of connected endpoints and remote systems are important. Upon receiving an imposter ID from the TAM, these integrated systems need to adopt a protection mechanism (e.g., delay/deny/partial execution/test records generation, etc.) secretly based on the risk score and at the same time allow the imposter to access the system without letting the imposter know about it (e.g., without letting the imposter know that they are a suspected imposter). The system needs to perform activity recordings and once a session is closed, share the activity logs with the TAM and temporarily disable the user ID used for the session. Based on the activity logs received from the integrated system, the TAM shares the consolidated report with assigned stakeholders for investigation. In addition, the TAM shares these logs with an integrated security information and event management (STEM) and incident response (IR) system to initiate an appropriate response.

Accordingly, with such a scenario, the problems of how to protect the endpoints/remote servers/IaaS computing environments from imposters where login users are getting authenticated thru an TAM system; how to identify and report the malicious intent of the identity imposter by understanding/monitoring/recording their after-intrusion activities with TAM integrated endpoint systems covertly; and how to prepare and respond to the risks arise. The proposed solution addresses these problems.

As discussed through this disclosure, the proposed solution secures an endpoint (e.g., desktop, laptop, etc.) and/or server from imposters. In some embodiments, the mechanism for securing the endpoint may comprise an Imposter Security Client (ISC) installed and enabled at an endpoint/on a remote server; a subscription based Imposter Security Service (ISS) that may be a part of an IAM system, or kept outside of an IAM system, subject to the choice of deployment; and an information exchange between the ISC and ISS that starts when the ISS gets automatically triggered upon receiving an imposter's ID from the IAM side and starts communicating with a respective ISC to get more information in order to protect the IAM side using endpoint and user specific policies/rules configured at the ISS end.

In some embodiments, the proposed solution may secure more than one connected computing environments, or CEs (endpoints, remote servers, VMs, containers, etc.), from imposters using a single ISS deployment. In such an embodiment, the mechanism for protection may comprise an ISS that receives imposter IDs from the IAM side and starts communicating with the ISCs installed and enabled at respective CEs; and a response mechanism that is adopted to protect one or more CEs from using the analytics done on collected information from various ISCs using a generic set of policies and rules configured at/from the ISS.

In some embodiments, the proposed solution may communicate threat (e.g., risk) details and responses with ISCs to secure one or more ISC installed systems from one or more imposters, covertly. In such an embodiment, the mechanism may comprise a coordinated working of the below-described ISS components: an imposter logs and activities (ILA) store which not only can receive host details, logs, activity requests, screen snapshots, UI recordings, etc. from ISC installed systems, but may also store ISS responses to imposter's requests/actions; a configurable rules and policies (CRP) engine that is an engine that has a pre-built/customized, generic/specific network-wise, OS-wise, software-wise, user-wise, department-wise and/or otherwise rules and policies defined, based on which ISS takes the defined action on immediately received ILA input; and a threat responder (TR) that comprises AI/ML models to find threat/risk patterns based on historical multiple inputs from imposter activities in the ILA stored requests/responses and with various ISCs. In some embodiments, a storage area network (SAN) outcome TR may dynamically update the policies/rules for/based on a particular imposter/system.

In some embodiments, the proposed solution may enable the ISC to take mandatory user input to fulfill a technical need (e.g., an AV upgrade, a post software installation, an OS update installed, or OS hanged, etc.) immediately at ISC installed machines, which may be initiated and controlled by the ISS. In such an embodiment, this may result in showing a bare OS UI to an imposter after a restart with no session restore options, a cleaned/cleared browser history, a remote desktop client history, cache memory, password vaults, etc.

In some embodiments, the proposed solution may enable the ISC to show a familiar chat window while simultaneously disabling other open UI windows. Further the chat window could, based on a company regulatory official input, ask the imposter to complete a pending regulatory/functional process, such as asking for verifiable information from the user (e.g., imposter) at/on ISC installed machines, which may be initiated by the ISS. This may result in getting the imposter distracted, reveal crucial indicators about self-identity, and finally abandon the system. In some embodiments, the sequence of questions may begin/start from common questions (e.g., department number, project charge code, etc.) and proceed to personal/in-depth questions (e.g., employee number, DOB, DOJ, other personal info, etc.).

In some embodiments, the proposed solution may include a technique for and IAM to enable imposter security to protect concerned CEs once it is detected that a user who logged in earlier as valid user, is actually an imposter (e.g., using various existing means of detection). In such an embodiment, the mechanism may comprise generating/creating a new imposter ID for the compromised user's identity based on available information; activating the ISS with the newly created imposter ID and information about exiting connections, which in-turn may activate relevant ISCs indirectly. The IAM may abruptly disconnect the existing connections which may get replaced by connections created by the ISS and ISCs (e.g., a device determined to be compromised by an imposter may have a connection to a secure database removed and replaced with a connection to a faux database that was generated by the ISS/ISCs. That is, the ISS, based on defined rules and policies, takes over the security of concerned CEs.

Referring now to FIG. 1A, illustrated is a block diagram of an example endpoint and remote server architecture 100, in accordance with aspects of the present disclosure. As depicted, the endpoint and remote server architecture 100 includes a first endpoint client 102, an imposter security client (ISC) 104A, a second endpoint client 106, an identity and access management single sign-on (IAM SSO) 108, a datacenter 110, an imposter security client (ISS) 112, an distinguished name (DN) for the first endpoint client 114, and a DN for the second endpoint client 116.

Before turning to a detailed example of what is depicted in FIG. 1A it may be helpful to describe the capabilities of the ISC 104A (and 104B-C, which are discussed below in regard to FIG. 1B) and the ISS 112. In some embodiments, the ISC 104A includes the capabilities to: host scan for applications, system configurations of various types, etc.; initiate a screen recorder to record UI activities, log keystrokes, mouse actions, etc.; turn on a camera to record video and/or take picture; cancel a transaction or keep loading a page with no results; initiate a random email/chat based imitation interaction to keep an imposter engaged; show UI for mandatory password change/system restart post upgrade that results in re-login/restart of system; send an email notification to a user/administrator (if an imposter if found); and/or offer an artificial sandboxed Virtual Desktop Infrastructure (VDI) with pre-planned obstacles.

In some embodiments, the ISS 112 includes the capabilities to: when configured properly, work in integration with various ISCs (e.g., 104A-C) to collect information regarding a host, installed hardware and/or software, applied security governance rules and policies, user behaviors, usage patterns, etc.; maintain a repository of a configurable set of rules, models to drive internet service provider (ISP) based response/actions to imposer's requests/activities on various types of: OS CLPs/powershells, browsers, file-systems, OS utilizes/admin apps, remote machine/app access, preinstalled software (e.g., office related applications) and hardware (e.g., camera), new software install/upgrade/downgrade/uninstall/etc.; dynamically detect threat severity from an imposter's past activities and influencing ISP's activity indirectly by updating necessary configurations discussed above; and/or upon closure of all imposter sessions, share the activities, risk findings, and recommendations with the IAM (e.g., IAM SSO 108) for investigation and further action.

Turning now to a detailed example in regard to FIG. 1A, in some embodiments, an imposter using a stolen user ID (e.g., the DN for the first or second endpoint client 114, 116) enters thru the IAM SSO 108 system. The IAM SSO 108 detects the incoming user as an imposter and allows them to access the intended computing environment, or CE (e.g., endpoint [e.g., the first or second endpoint clients 102, 106], remote server, VM, container, etc.), thru the ISS 112 instead of giving direct access as the ISS 112 is designed to provide security to the CEs from imposters. In some embodiments, the ISC 104A is installed on a CE including endpoints (e.g., the first endpoint client 102), which needs to be protected in any organization which subscribes to the ISS 112. In some embodiments, based on the machine/device where the ISC 104A is installed, its working can be customized to specifically protect any particular CE. In some embodiments, as depicted, the ISC 104A protects the first endpoint client 102 from being accessed and targeted by the second endpoint client 106, which could be an unauthorized user.

Figure 1B:
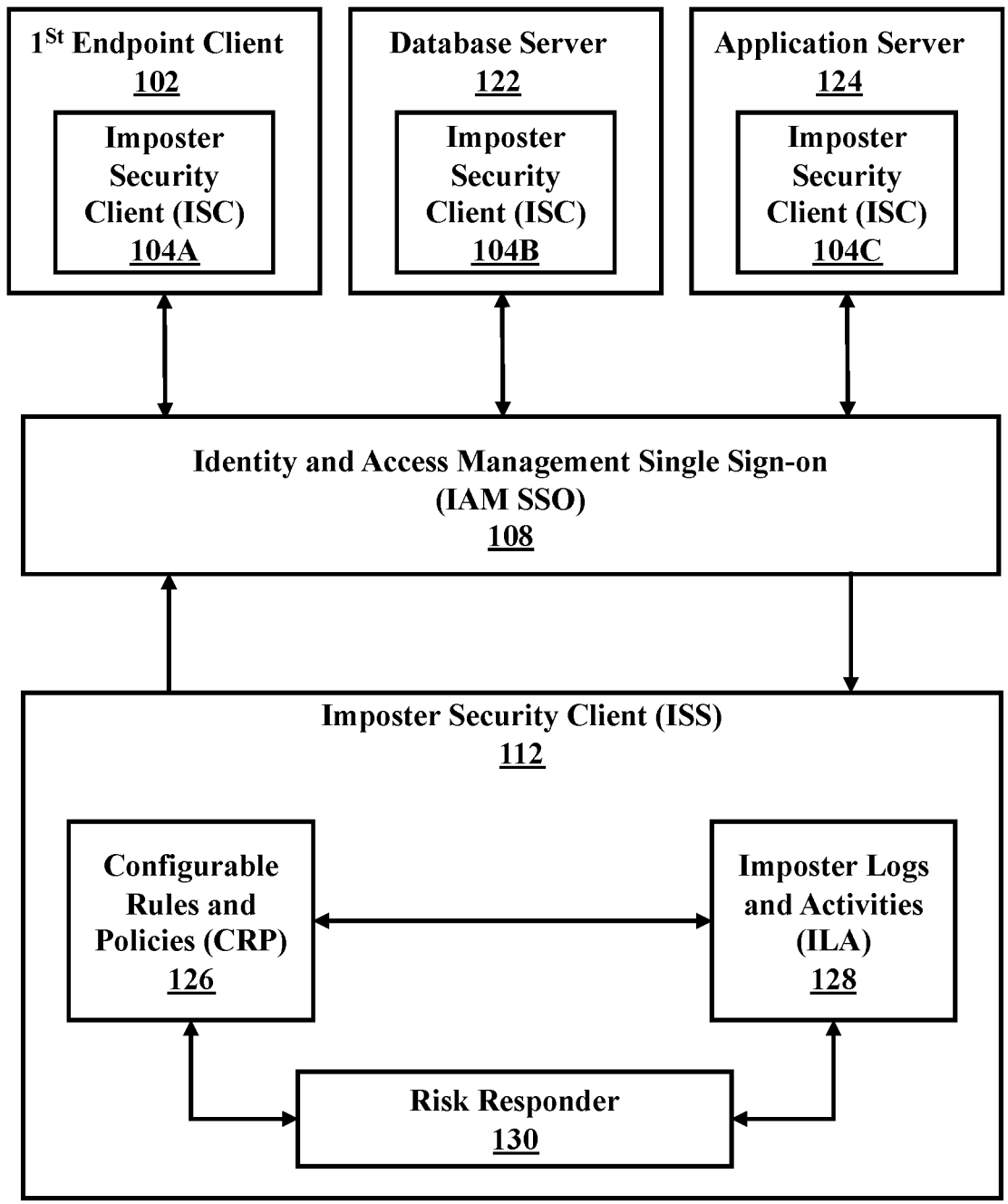
FIG. 1B illustrates a block diagram of another example endpoint and remote server architecture with imposter security service (ISS) components, in accordance with aspects of the present disclosure.

Referring now to FIG. 1B, illustrated is a block diagram of another example endpoint and remote server architecture 120 with ISS components, in accordance with aspects of the present disclosure. In some embodiments, the endpoint and remote server architecture 120 includes the same or substantially similar components as found in the endpoint and remote server architecture 100. As depicted, the endpoint and remote server architecture 120 includes the first endpoint client 102 with the ISC 104A, a database server 122 with an ISC 104B, an application server 124 with an ISC 104C, the IAM SSO 108, and the ISS 112.

As further depicted the ISS 112 is shown with a plurality of its novel components, namely: configurable rules and policies (CRP) 126, imposter logs and activities (ILA) 128, and a risk responder 130. In some embodiments, the ISS 112 covertly/hiddenly communicates with the ISCs 104A-C and relays risk details and responses to secure one or more ISC 104A-C installed systems/devices (e.g., the first endpoint client 102, the database server 122, and/or the application server 124) from one or more unauthorized users. In such an embodiment, the mechanism or communication and security includes the coordinated working of below ISS 112 components.

In such an embodiment, the CRP 126 is an engine that has a pre-built/customized, generic/specific network-wise, OS-wise, software-wise, user-wise, department-wise and/or otherwise rules and policies defined, based on which the ISS 112 takes defined action on immediately received ILA 128 input.

Further, in such an embodiment, the ILA 128 is a store/repository/database that can not only receive host details, logs, activity requests, screen snapshots, UI recordings, etc. from any combination of the ISCs 104A-C installed systems, but may also stores ISS 112 responses to unauthorized user requests/actions.

Additionally, in such an embodiment, the risk responder 130 may be comprised of AI/ML models that find risk/threat patterns based on multiple historical inputs from imposter/unauthorized user activities in the ILA 128 stored requests/responses as associated with the various ISCs 104A-C. As an outcome the risk responder 130 dynamically (in real-time) and automatically updates the policies/rules based on a particular imposter and/or ISC 104A-C installed system.

Turning now to a detailed example, assume the scenario where Bob and Tom are working as application support executives at Bank-X's backend office and Bob has recently been enabled with a privileged account to (i) tackle mission critical defects by directly accessing a production database and (ii) do external mail communication directly with customers. Both Bob and Tom have a common acquaintance— Suzy who is working as a loan agent in Bank-Y, a competitor of Bank-X.

To achieve yearly targets, Suzy approaches Bob and Tom to get some reference customers for marketing Bank-Y's new mortgage loan offering. Suzy promises Bob and Tom a good percentage of commission from her share in the case referral customers on-board. Bob ignores Suzy's proposal and moves on. On the other hand, Tom pursues the opportunity.

In a discussion with Suzy, Tom planned to acquire Bob's set of customers data from Bank-X's production database. Within a week, Tom moved his seat nearer to Bob's seat and started noticing the system password keystrokes secretly without knowing that the Bank-X has already subscribed to the Imposter Security Service (ISS 112) to protect its endpoints (e.g., 102) and servers (e.g., 122, 124). Detailed below is how Bank-X's ISS 112 subscription not only identified the intentions of Tom, but also collected enough evidence to provide for remediation action.

On a Friday evening Tom stayed late in the office with an intention to try the password he had secretly acquired on Bob's desktop (e.g., the first endpoint client 102). After 3 unsuccessful attempts, one key combination worked successfully. Behind the scene though, the 3 unsuccessful login attempts triggered IAM (e.g., IAM SSO 108) to cross-validate the user access with Bob using multi-factor authentication (MFA) on his mobile phone as per Bank-X's IAM policy (e.g., as defined in the CRP 126), which he declined. The IAM is now sure that the user trying Bob's ID from the office desktop is an imposter/unauthorized user. The IAM creates/generates an imposter ID with below details and allows Tom to get the access of Bob's office desktop. The imposter ID could include: bob@bankx.com (e.g., the user ID which is compromised), an unknown potential insider ID (e.g., as Bob's office machine is being accessed directly but the suspect ID could not get detected so far, a potential ID could be generated), and/or a high risk score (e.g., as an insider [Tom] may know the environment well, damage could be very fast).

Furthering the example, Tom could be aware that the production database (e.g., the database server 122) can be accessed now as SSO is enabled. Tom may open up his favorite browser, but as soon as he types the URL, he may be interrupted by a pop-up window with a mandatory system restart message. Tom may have no other option but to restart and wait. Behind the scene though, as soon as Tom logs in successfully, the desktop ISC (e.g., ISC 104A) connects to the ILA 128 in the ISS 112 to: pass-on host scan details and record the successful login entry.

In some embodiments, based on this entry in the ILA 128, the CRP 126, is triggered to suggest a counter-action (or response) to Tom's login action as per the rule (if any). In this case, the CRP 126 suggests to start recording: activates along with keystrokes, a UI screen, user video if a camera is available, etc.

Continuing the example, upon opening the browser window, the ISC 104A may notice that browser history, password vaults, and/or cookies are available, all of which may help the unauthorized user (Tom), thus, the ISC 104A may trigger a mandatory restart pop-up to clean every generic, reusable item from the desktop, browser, and other software.

Post restart, Tom may see that his desktop is changed and that there is no shortcut on the desktop, but he ignored this to open a browser link from a "Start" menu and passes on the link to open a database client. To Tom's disappointment, the browser may now show a "certificate is expired" error. Behind the scene though, the ISC 104A passes Tom's activities to the ILA 128 at the ISS 112. As soon as Tom opens the browser and tries accessing the database client window, as per the CRP 126's direction, the ISC 104A manipulates the request and starts showing the "certificate is expired" error on the browser. The ISS 112 additionally notes the unauthorized user's (as the ISS 112 does not know Tom's identity yet) interest in the production database.

Furthering the example, Tom may be disappointed with the certificate expiry error but think of using an interface command line (CLI) based connection instead of fixing the error. In such an instance, Tom may open the CLI and ping the production database (e.g., the database server 122), which may work and allow Tom to see a list of tables. Behind the scene though, as soon as Tom issues a database connection request from the CLI using the imposter ID, the database server 122 learns/identifies that it is an imposter connection. The ISC 104B of the database server 122 gets activated and connects with the ILA 128 at the ISS 112 to make login entry and share host scan details.

In some embodiments, communication between ISCs 104A and/or 104B and the ISS 112 occurs when activities "CLI opening" and/or "DB connection created" by Tom. In some embodiments, when an imposter is identified/confirmed and/or a risk to the database sever 122 (or datacenter 110) is identified/confirmed, looking at the imposter's activities, the CRP 126 may automatically update rules and/or policies accordingly. In some embodiments, as per the CRP 126's response, the ISC 104B of the database server 122 starts recording the imposter's activities which allows: seeing a list of tables (which could be fictious or generated mocks), returns of manipulated/fictious data for select statements, and/or not allowing the imposter to update/delete any data and instead showing that "data is currently in use by other users" error and ILA 128 record commands.

Continuing the example, Tom runs a command to copy all data from CUSTOMER table in mydata.csv in C: \ and opens this file in a notepad to confirm that data is properly copied. Behind the scene though, in response to Tom's data copy command received from the ISC 104B of the Database Server 122, the ILA 128 at the ISS 112 directs the ISC 104B to return a manipulated table data in a CSV file as per a defined policy (found in the CRP 126) and confirms "DB data pilfering" risk, based on the latest imposter's activities. In some embodiments, the imposter is also allowed to create/generate a new file as per rules (found in the CRP 126). In such an embodiment, opening of the file (mydata.csv in this case) by the imposter is also allowed so Tom could open and see file content; the ILA 128 may register these entries and ISS 112 responses.

Again furthering the example, Tom may know that he can't copy or export this data in/to external storage, but he is aware that Bob can send emails to external clients. So Tom opens Bob's mail client, composes a mail, attaches mydata.csv file, and sends the mail to Suzy. After receiving confirmation, Tom deletes mail from the sent folder to omit the proof and closes the mail client. Behind the scene though, as soon as Tom issues a mail server connection request using the imposter ID, the mail server (e.g., the application server 124) learns that it is an imposter connection. The ISC 104C gets activated and connects with the ILA 128 to make a login entry and shares host scan details. As per the CRP 126's response, the ISC 104C may start to record activities which allow for the imposter to: see a randomized list of mail from last year with the latest dates while hiding latest emails; search/sort mail; see imitation confirmations to send new mail but stores the new mail; see manipulated content for selected mail; and/or delete any mail instead, but instead is shown fake confirmations while hiding a mail at a client window (e.g., the mail is not allowed to be deleted). In such an embodiment, Tom would receive a confirmation that the mail was sent to Suzy, but the mail would just be hidden and stored.

Continuing the example, Tom is about to shut down the desktop but receive a chat notification, such as, "Congratulation's Bob! Just sent a list of leads to you, please confirm you received?" Tom is now curious to know the list of leads and opens the mail client again to see there is new mail with a PDF attachment that is password protect. Tom responds to the new mail and asks for the password, but Tom learns that the password is sent to Bob through an SMS message. Tom forwards the email to himself, deletes the mail and forwarding confirmation, and then turns off the desktop.

Behind the scene though, the risk responder 130 detects the possible data pilfering and that exfiltration activity has occurred by the imposter. To stop the imposter from making any further damage, the ISS 112 redirects the ISCs 104A and 104C to send the chat notification and email. If the imposter responds to the chat and/or interacts with the new mail, the actions are further recorded and increase the changes for remediation action.

Figure 2:
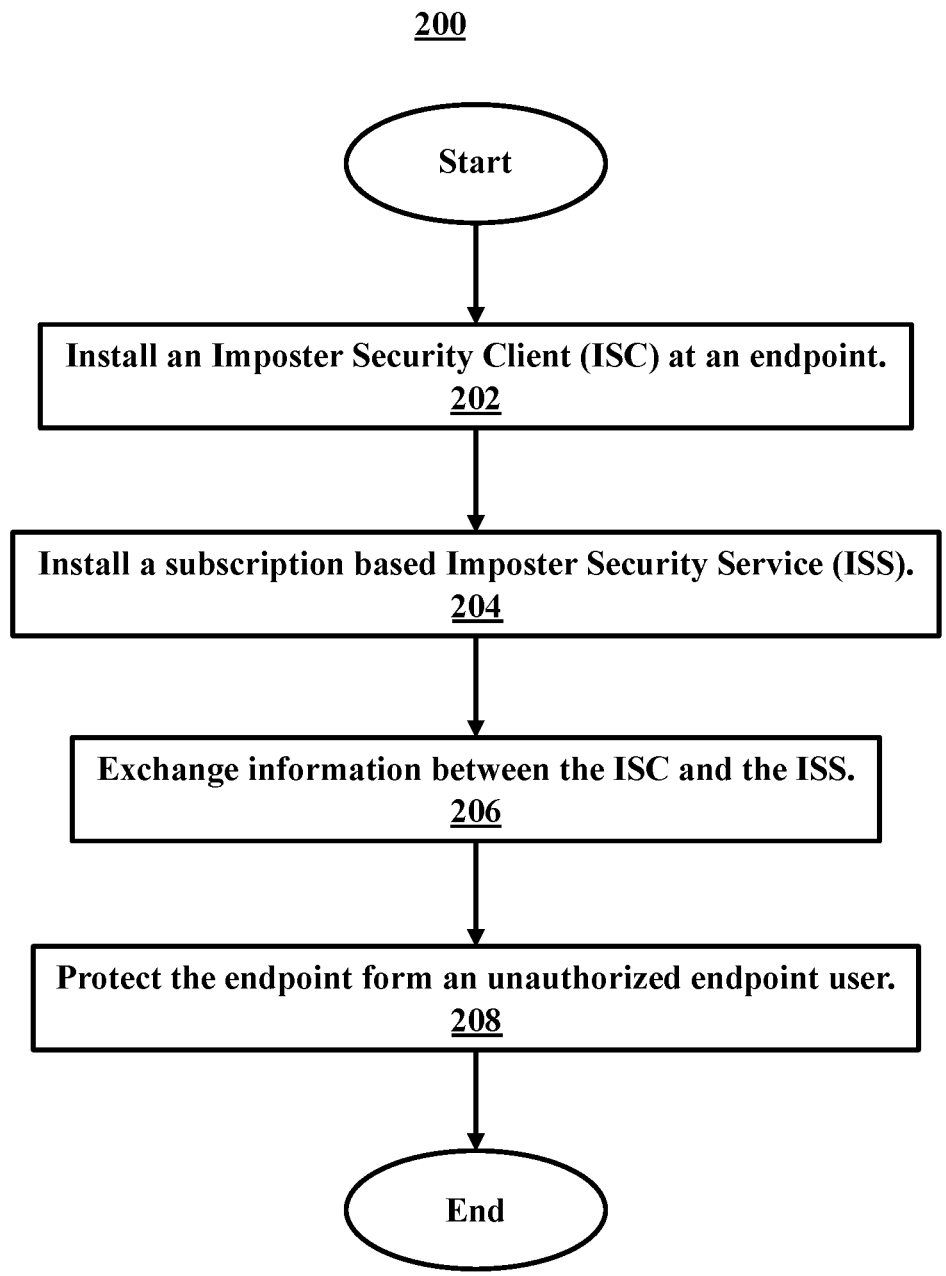
FIG. 2 illustrates a flowchart of an example method to secure an endpoint from invalid users, in accordance with aspects of the present disclosure.

Referring now to FIG. 2, illustrated is a flowchart of an example method 200 to secure an endpoint from invalid users, in accordance with aspects of the present disclosure. In some embodiments, the method 200 may be performed by a processor (e.g., of the endpoint and remote server architecture 100 of FIG. 1B, of the endpoint and remote server architecture 120 of FIG. 1B, etc.).

In some embodiments, the method 200 begins at operation 202 where the processor installs/enables an ISC at an endpoint. In some embodiments, the method 200 proceeds to operation 204 where the processor installs/enables a subscription based ISS. The ISS may be part of an IAM system.

In some embodiments, the method 200 may proceed to operation 206 where the processor may exchange information between the ISC and the ISS. The exchange may automatically be triggered when the ISS receives an imposter ID from the IAM system. The imposter ID may be associated with an unauthorized endpoint user (or activity).

In some embodiments, the method 200 may proceed to operation 208 where the processor may protect the endpoint from the unauthorized endpoint user. In some embodiments, after operation 208, the method 200 may end.

In some embodiments, discussed below, there are one or more operations of the method 200 not depicted for the sake of brevity and which are discussed throughout this disclosure. Accordingly, in some embodiments, the processor may further secure the endpoint with a single ISS deployment. Securing the endpoint with the ISS deployment may include communicating with the ISC, generating a response mechanism, and enacting the response mechanism. In some embodiments, the response mechanism may be generated based on information from one or more other ISCs (using a generic set of policies and rules configured at the ISS [e.g., the CRP]).

In some embodiments, securing the endpoint with the single ISS deployment includes the processor coordinating, by the ISS (or one or more components thereof), a hidden workflow. The hidden workflow (between the one or more components of the ISS) may be unknown to the unauthorized endpoint user (e.g., generating imitation lists, etc.).

In some embodiments, coordinating the hidden workflow may include accessing an ILA store. The ILA store may receive information about endpoint and responses to prior unauthorized endpoint users (e.g., imposter IDs). The processor may further receive configurable rules and policies based on input from the ILA store. The processor may enact a risk responder. The risk responder may dynamically update the configurable rules and policies based on an identified unauthorized endpoint user (e.g., the unauthorized user has the same pattern as a previous unauthorized user and that previous unauthorized user was stopped by generating a sandbox environment, etc.).

In some embodiments, protecting the endpoint from the unauthorized endpoint user includes the processor restarting the endpoint and presenting a bare operating system user interface (e.g., all information is deleted/inaccessible) to the unauthorized endpoint user. In some embodiments, restarting the endpoint removes one or more options from the endpoint (e.g., cookies cannot be enabled, etc.).

In some embodiments, the processor generates an unauthorized endpoint user prompt. The unauthorized endpoint user prompt may include one or more inquiries into the identity of the unauthorized endpoint user (e.g., which department do you work for?, who is your manager?, etc.). The processor may present the unauthorized endpoint user prompt to the unauthorized endpoint user.

In some embodiments, the processor may identify that the unauthorized endpoint user was allowed to access the endpoint (e.g., as a valid user). The processor may generate a new imposter ID for the unauthorized endpoint user. The processor may alert the ISS. The processor may disconnect one or more existing connections identified as compromised by the unauthorized endpoint user being allowed access to the endpoint.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
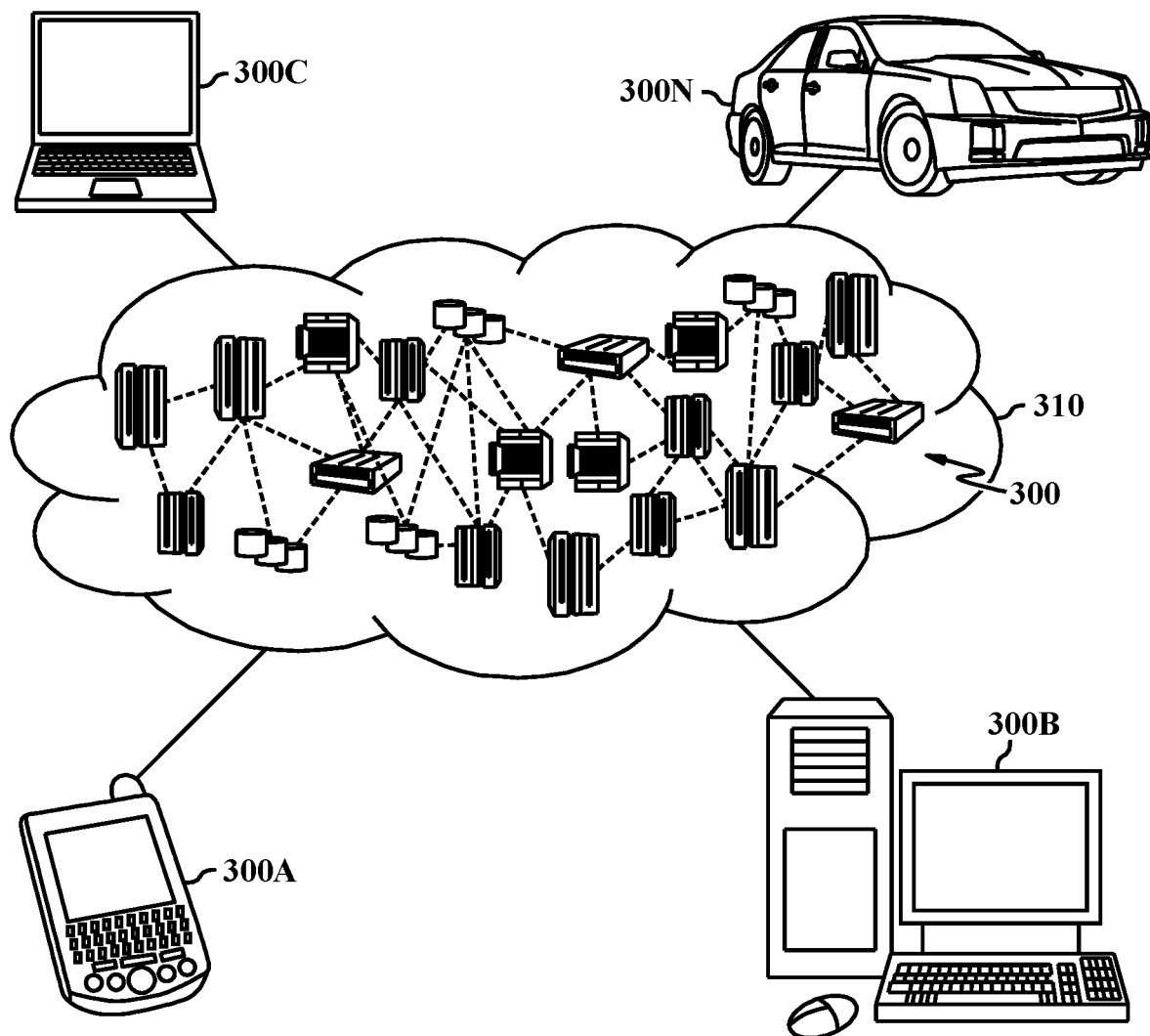
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
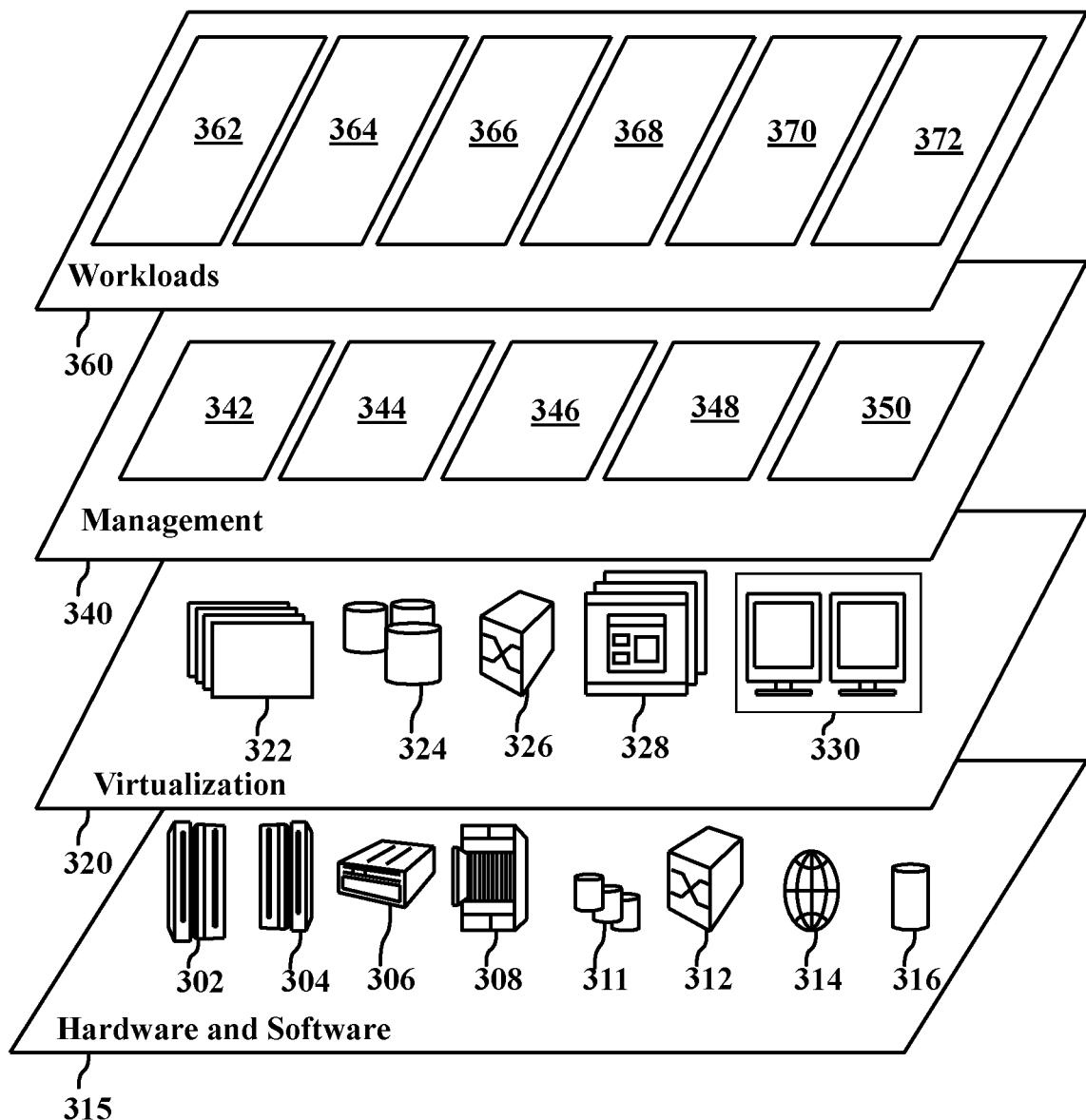
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and securing an endpoint from invalid users 372.

Figure 4:
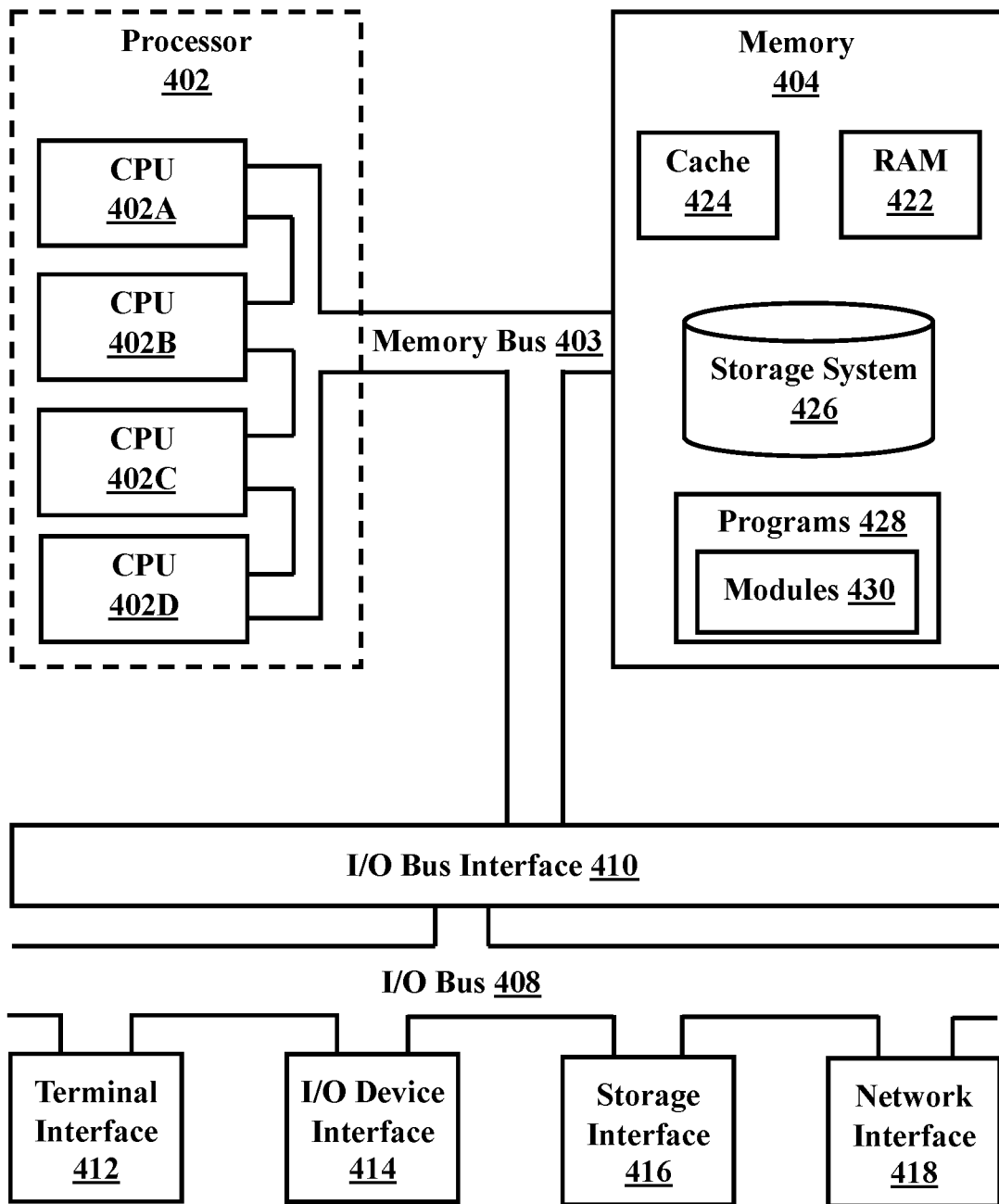
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system to secure an endpoint from invalid users, the system comprising:
   a memory; and
   a hardware processor in communication with the memory, the hardware processor being configured to perform operations comprising:
   installing an Imposter Security Client (ISC) at an endpoint;
   installing a subscription based Imposter Security Service (ISS), wherein the ISS may be part of an Identity and Access Management (IAM) system;
   exchanging information between the ISC and the ISS, wherein the exchange is automatically triggered when the ISS receives an imposter identification (ID) from the IAM system, and wherein the imposter ID is associated with an unauthorized endpoint user; and
   coordinating, by the ISS, a hidden workflow, wherein the hidden workflow is unknown to the unauthorized endpoint user and includes:
   accessing an imposter logs and activities (ILA) store, wherein the ILA store receives information about endpoint and responses to prior unauthorized endpoint users;
   receiving configurable rules and policies based on input from the ILA store;
   enacting a risk responder, wherein the risk responder dynamically updates the configurable rules and policies based on an identified unauthorized endpoint user;
   disconnecting, based on the dynamically updated configurable rules and policies, one or more existing connections identified as compromised by the unauthorized endpoint user being allowed access to the endpoint;
   generating, by the ISS, a faux database; and
   replacing, by the ISS, the disconnected one or more existing connections identified as compromised with a connection to the faux database.

2. The system of claim 1, wherein the processor is further configured to perform operations comprising:
   securing the endpoint with a single ISS deployment, wherein securing the endpoint with the ISS deployment includes:
   communicating with the ISC,
   generating a response mechanism, wherein the response mechanism is generated based on information from one or more other ISCs, and
   enacting the response mechanism.

3. The system of claim 1, wherein protecting the endpoint from the unauthorized endpoint user includes:
   restarting the endpoint, wherein restarting the endpoint removes one or more options from the endpoint; and
   presenting a bare operating system user interface to the unauthorized endpoint user.

4. The system of claim 3, wherein the processor is further configured to perform operations comprising:
   generating an unauthorized endpoint user prompt, wherein the unauthorized endpoint user prompt includes one or more inquiries into the identity of the unauthorized endpoint user; and
   presenting the unauthorized endpoint user prompt to the unauthorized endpoint user.

5. A computer-implemented method to secure an endpoint from invalid users, the method comprising:
   installing, by a processor, an Imposter Security Client (ISC) at an endpoint;
   installing a subscription based Imposter Security Service (ISS), wherein the ISS may be part of an Identity and Access Management (IAM) system;
   exchanging information between the ISC and the ISS, wherein the exchange is automatically triggered when the ISS receives an imposter identification (ID) from the TAM system, and wherein the imposter ID is associated with an unauthorized endpoint user; and
   coordinating, by the ISS, a hidden workflow, wherein the hidden workflow is unknown to the unauthorized endpoint user and includes:

accessing an imposter logs and activities (ILA) store, wherein the ILA store receives information about endpoint and responses to prior unauthorized endpoint users;

receiving configurable rules and policies based on input from the ILA store;

enacting a risk responder, wherein the risk responder dynamically updates the configurable rules and policies based on an identified unauthorized endpoint user;

disconnecting, based on the dynamically updated configurable rules and policies, one or more existing connections identified as compromised by the unauthorized endpoint user being allowed access to the endpoint;

generating, by the ISS, a faux database; and replacing, by the ISS, the disconnected one or more existing connections identified as compromised with a connection to the faux database.

6. The computer-implemented method of claim 5, further comprising:

securing the endpoint with a single ISS deployment, wherein securing the endpoint with the ISS deployment includes:
communicating with the ISC,
generating a response mechanism, wherein the response mechanism is generated based on information from one or more other ISCs, and
enacting the response mechanism.

7. The computer-implemented method of claim 5, wherein protecting the endpoint from the unauthorized endpoint user includes:

restarting the endpoint, wherein restarting the endpoint removes one or more options from the endpoint; and presenting a bare operating system user interface to the unauthorized endpoint user.

8. The computer-implemented method of claim 7, further comprising:

generating an unauthorized endpoint user prompt, wherein the unauthorized endpoint user prompt includes one or more inquiries into the identity of the unauthorized endpoint user; and presenting the unauthorized endpoint user prompt to the unauthorized endpoint user.

9. A computer program product to secure an endpoint from invalid users comprising a computer readable storage device having program instructions embodied therewith, the program instructions executable by a processor to cause the processor to perform operations, the operations comprising:

installing an Imposter Security Client (ISC) at an endpoint;

installing a subscription based Imposter Security Service (ISS), wherein the ISS may be part of an Identity and Access Management (IAM) system;

exchanging information between the ISC and the ISS, wherein the exchange is automatically triggered when the ISS receives an imposter identification (ID) from the TAM system, and wherein the imposter ID is associated with an unauthorized endpoint user; and coordinating, by the ISS, a hidden workflow, wherein the hidden workflow is unknown to the unauthorized endpoint user and includes:

accessing an imposter logs and activities (ILA) store, wherein the ILA store receives information about endpoint and responses to prior unauthorized endpoint users;

receiving configurable rules and policies based on input from the ILA store;

enacting a risk responder, wherein the risk responder dynamically updates the configurable rules and policies based on an identified unauthorized endpoint user;

disconnecting, based on the dynamically updated configurable rules and policies, one or more existing connections identified as compromised by the unauthorized endpoint user being allowed access to the endpoint;

generating, by the ISS, a faux database; and replacing, by the ISS, the disconnected one or more existing connections identified as compromised with a connection to the faux database.

10. The computer program product of claim 9, wherein the processor is further configured to perform operations comprising:

securing the endpoint with a single ISS deployment, wherein securing the endpoint with the ISS deployment includes:
communicating with the ISC,
generating a response mechanism, wherein the response mechanism is generated based on information from one or more other ISCs, and
enacting the response mechanism.

11. The computer program product of claim 9, wherein protecting the endpoint from the unauthorized endpoint user includes:

restarting the endpoint, wherein restarting the endpoint removes one or more options from the endpoint; and presenting a bare operating system user interface to the unauthorized endpoint user.

12. The computer program product of claim 11, wherein the processor is further configured to perform operations comprising:

generating an unauthorized endpoint user prompt, wherein the unauthorized endpoint user prompt includes one or more inquiries into the identity of the unauthorized endpoint user; and presenting the unauthorized endpoint user prompt to the unauthorized endpoint user.

* * * * *